3,717,191
PNEUMATIC TIRE WITH A BREAKER OF
VARIABLE STIFFNESS
Wilfred H. Harrington, Solihull, and Alfred H. Grossett,
Lichfield, England, assignors to The Dunlop Company
Limited, London, England
Filed Sept. 8, 1970, Ser. No. 70,157
Claims priority, application Great Britain, Sept. 18, 1969,
46,011/69
Int. Cl. B60c 9/18
U.S. Cl. 152—361  11 Claims

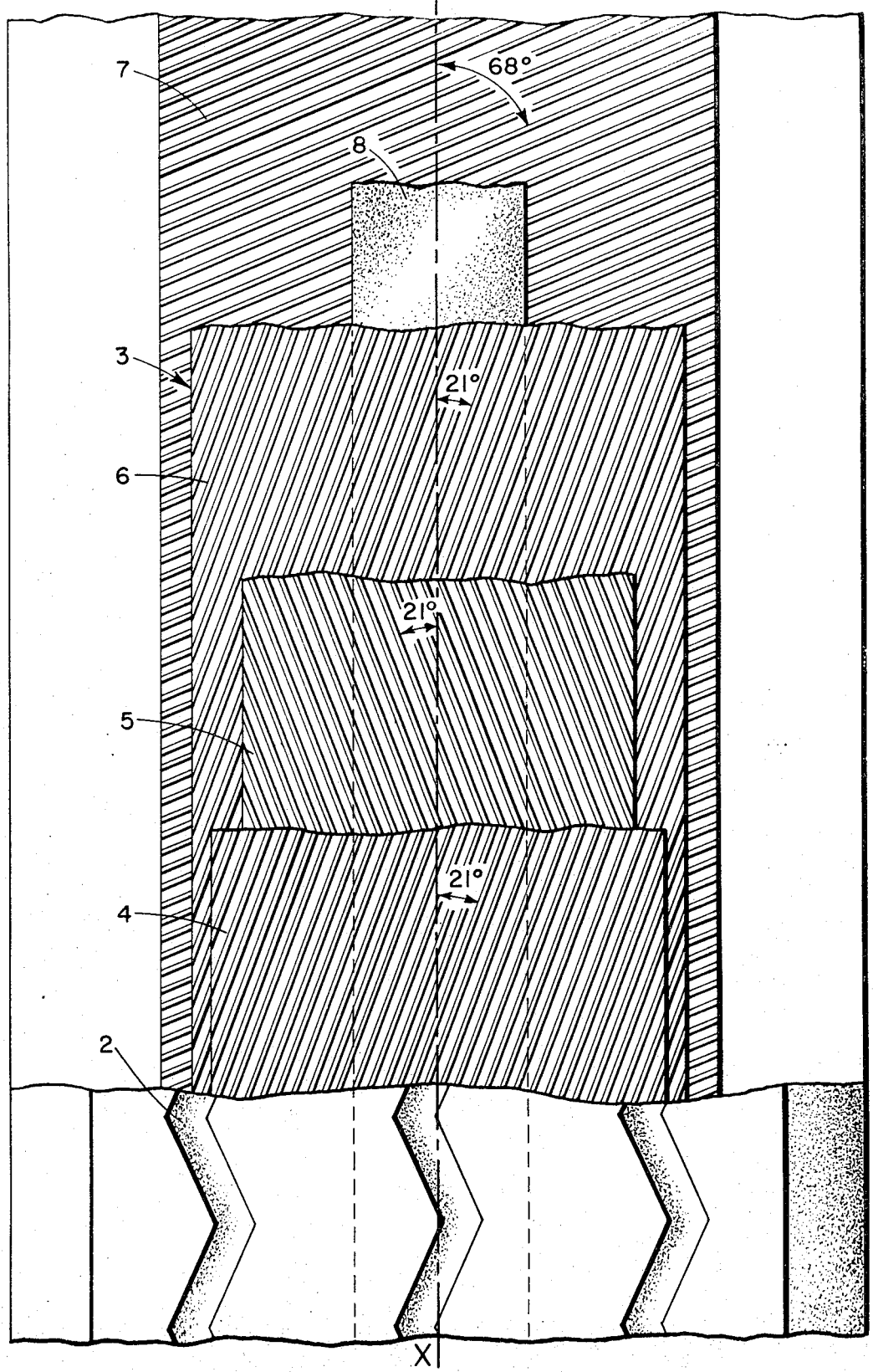

ABSTRACT OF THE DISCLOSURE

A pneumatic tire of the kind having a carcass, tread and breaker assembly. The breaker assembly comprises at least one layer of cords of high bias angle and at least two layers of cords of low bias angle. A layer of rubber compound of width less than the adjacent breaker layers is interposed between a pair of the breaker layers, preferably between the high bias angle layer and an adjacent low bias angle layer.

---

Figure 1:
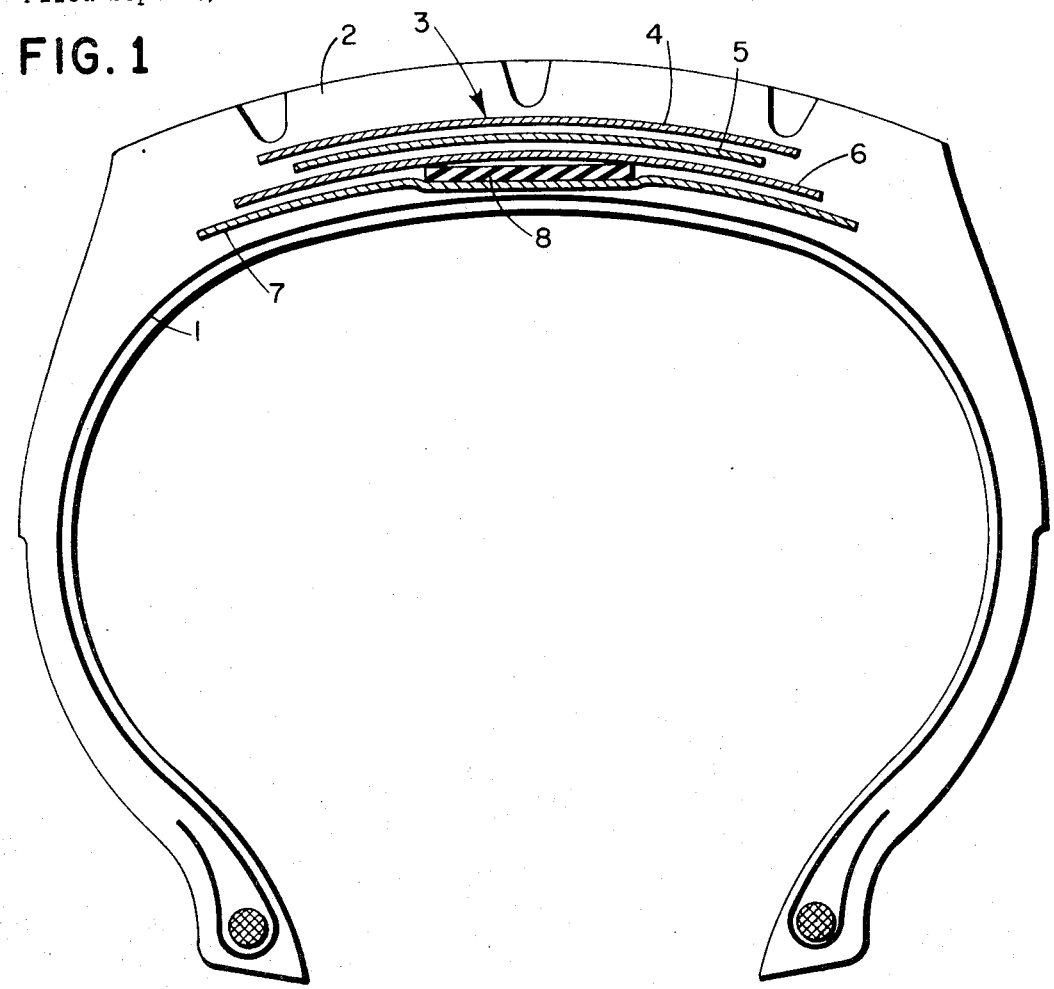

This invention relates to pneumatic tires, and more particularly to tires of the type in which a breaker assembly comprising a plurality of superposed layers of cord fabric is positioned beneath the tread.

According to the present invention there is provided a pneumatic tire which comprises a carcass and tread and a breaker assembly, the breaker assembly comprising at least one layer of cord fabric in which the cords have a relatively high bias angle with respect to the mid-circumferential plane of the tire and at least two layers of cord fabric in which the cords have a relatively low bias angle with respect to the mid-circumferential plane of the tire and, interposed between an adjacent pair of the layers of cord fabric, a layer of rubber compound having a transverse width less than that of the adjacent layers of cord fabric whereby the breaker assembly varies in stiffness across its width.

The breaker assembly preferably comprises one layer of cord fabric in which the cords have a relatively high bias angle with respect to the mid-circumferential plane of the tire, the cords in this layer preferably having a bias angle of between 50° and 90°.

In the layers of cord fabric in which the cords have a relatively low bias angle with respect to the mid-circumferential plane of the tire the cords preferably have a bias angle of between 18° and 38° and it is preferred that the breaker assembly contains three of these layers.

The superposed layers of cord fabric in which the cords have a relatively low bias angle are preferably arranged so that the bias angle of the cords in each layer is in the opposite plane to that of the cords in the adjacent layer or layers.

The cord fabrics used in the breaker assembly may all be of the same cord material or may, if desired, be of various different materials. Suitable cord materials are nylon, polyester, rayon, glass and steel.

The rubber compound may be a compound which, when vulcanized, has a hardness in the range 60° BS to 80° BS but preferably is a compound which, when vulcanized, has a hardness of not greater than 70° BS. Preferably the layer of rubber compound has a thickness in the range ¼ to 2¼ times the thickness of the layer of cord fabric having the high bias angle.

Preferably the layer of rubber compound is a strip of rubber compound positioned in the center of the breaker assembly i.e. below the crown of the tire and in this case the breaker assembly is less stiff in its central region than in the shoulder regions. Such a strip preferably has a width which is in the range ¼ to ½ the width of the widest layer of cord fabric having a low bias angle.

Alternatively, however, the layer of rubber compound can be a pair of strips of the rubber compound positioned one in each shoulder of the breaker assembly. In this case the breaker assembly is more stiff in its central region than in the shoulder regions.

If desired a breaker assembly of graduated stiffness can be produced by providing, as the layer of rubber compound, a strip of rubber whose thickness varies across its width.

Preferably the layer of cord fabric of high bias angle is positioned radially inwardly of the layers of cord fabric of low bias angle.

In this case it is also preferred but not essential that the bias of the cords in the layer of cord fabric of high bias angle is in the same plane as the bias of the cords in the adjacent layer of cord fabric of low bias angle. Preferably also the layer of rubber compound is positioned between the layer of cord fabric of high bias angle and an adjacent layer of cord fabric of low bias angle.

Figure 2:
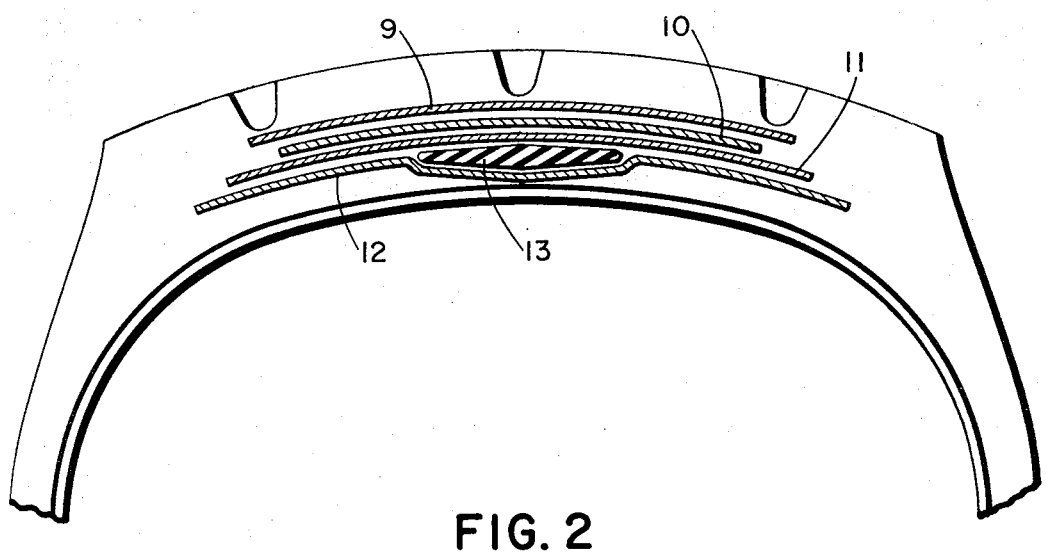

Two embodiments of the invention will now be described, by way of example only with reference to the accompanying drawings in which:

FIG. 1 illustrates schematically the cross-section of the tire of a first embodiment of the invention, FIG. 2 shows schematically the construction of the breaker assembly in a second embodiment of the invention and FIG. 3 is a plan view partially broken away to show the tire bias angles.

In the first embodiment as shown in FIG. 1 a pneumatic tire consists of a carcass 1, tread 2 and breaker assembly 3. The breaker assembly contains three adjacent superposed layers 4, 5 and 6 of steel cord fabric of low bias angle each layer having a bias angle of 21°. The bias angle of the cord fabric in the radially outermost layer 4 is in the same plane as that of the cord fabric in the radially innermost layer 6 and the bias angle of the cord fabric intermediate layer 5 is in the opposite plane. The width of the radially outermost layer 4 is slightly less than that of the radially innermost layer 6 and the width of the intermediate layer 5 is less than that of the others.

Radially inwardly of the three layers of cord fabric of low bias angle the breaker assembly contains a single layer 7 of steel cord fabric of high bias angle the bias angle being 68°. The bias angle of the layer 7 is in the same plane as the bias angle of the radially innermost layer 6 of low bias angle.

Between the cord fabric layer 7 of high bias angle and the radially innermost cord fabric layer 6 of low bias angle there is positioned a 4.0 mm. thick strip 8 of rubber having a hardness of 70° BS. The center of the strip 8 is positioned in the mid-circumferential plane so that the strip in the tire extends axially outwardly in both directions from the mid-circumferential plane of the tire and the width of the strip is one third of the width of the widest layer 6 of cord fabric of low bias angle.

Thus the breaker assembly is considerably stiffer in the shoulder region than the crown region of the tire and the tire tread is stiff in the shoulder region but flexible in the crown region.

In the second embodiment a pneumatic tire consists of a carcass, tread and breaker assembly as in the first embodiment. The breaker assembly is illustrated schematically in FIG. 2 and contains three layers 9, 10 and 11 of cord fabric of low bias angle, and one layer 12 of cord fabric of high bias angle arranged as in the breaker assembly in the first embodiment. In the second embodiment, however, a strip 13 of rubber of hardness 70° BS is used the strip 13 having a thickness of 4.0 mm. at its center, tapering off symmetrically from its center to have a thickness of 0.2 mm. at its edges.

The strip 13 of rubber is positioned between the cord fabric layer 12 of high bias angle and the radially innermost cord fabric layer 11 of low bias angle with its center in the mid-circumferential plane of the tire. The strip 13 thus extends axially outwardly in both directions from the mid-circumferential plane. In this case also the width of the strip 13 is one third of the width of the widest cord fabric layer 11 of low bias angle.

In this embodiment the breaker assembly is again stiffer in the shoulder region than the crown region of the tire but the change in stiffness from the one region to the other is more gradual than in the first embodiment because of the varying thickness of the rubber strip.

It will be appreciated that although the embodiments of the invention above both have symmetrical configurations, the position and/or thickness of the layer of rubber can be varied to produce configurations which have asymmetric properties.

Having now described our invention—what we claim is:

1. A pneumatic tire which comprises a carcass and tread and a breaker assembly, the breaker assembly comprising at least one layer of cord fabric in which the cords have a relatively high bias angle with respect to the mid-circumferential plane of the tire and at least two layers of cord fabric in which the cords have a relatively low bias angle with respect to the mid-circumferential plane of the tire and the cords of adjacent layers are oppositely biased, a layer of rubber compound of 60°–80° BS interposed between an adjacent pair of the layers of fabric with its entire width contacting only one surface of each of the fabric layers between which it is interposed, said rubber layer having a transverse width substantially less than that of the adjacent layers of cord fabric and extending circumferentially substantially coextensive with the layers of cord fabric whereby the breaker assembly is less stiff in that portion having the rubber compound.

2. A pneumatic tire according to claim 1 in which the layer of cords having a relatively high bias angle with respect to the mid-circumferential plane of the tire has a bias angle of between 50° and 90°.

3. A penumatic tire according to claim 1 in which the cords having a relatively low bias angle with respect to the mid-circumferential plane of the tire have a bias angle of between 18° and 38°.

4. A pneumatic tire according to claim 3 in which the breaker assembly includes three layers of cords having a relatively low bias angle with respect to the mid-circumferential plane of the tire.

5. A pneumatic tire according to claim 1 in which the layer of rubber compound has a thickness in the range ¼ to 2¼ times the thickness of the layer of cord fabric having the high bias angle.

6. A pneumatic tire according to claim 1 in which the layer of rubber compound is a strip of rubber compound positioned in the centre of the breaker assembly below the crown of the tire.

7. A pneumatic tire according to claim 6 in which the strip has a width which is in the range ¼ to ½ the width of the widest layer of cord fabric having a relatively low bias angle.

8. A pneumatic tire according to claim 1 in which the layer of rubber compound comprises a strip of rubber compound whose thickness varies across its width whereby the breaker assembly is graduated in stiffness.

9. A pneumatic tire according to claim 1 in which the layer of cord fabric of high bias angle is positioned radially inwardly of the layers of cord fabric of low bias angle.

10. A pneumatic tire according to claim 9 in which the bias of the cords in the layer of cord fabric of high bias angle is in the same plane as the bias of the cords in the adjacent layer of cord fabric of low bias angle.

11. A pneumatic tire according to claim 1 in which the layer of rubber compound is positioned between the layer of cord fabric of high bias angle and an adjacent layer.

References Cited
UNITED STATES PATENTS

| | | | |
|---|---|---|---|
| 2,493,614 | 1/1950 | Bourdon | 152—361 UX |
| 3,018,814 | 1/1962 | Saint-Paul | 152—361 |
| 3,612,136 | 10/1971 | Gough | 152—361 |
| 3,515,197 | 6/1970 | Boileau | 152—361 |

GERALD M. FORLENZA, Primary Examiner

G. H. LIBMAN, Assistant Examiner

U.S. Cl. X.R.

152—360